United States Patent
Bayapuneni et al.

(10) Patent No.: US 9,665,386 B2
(45) Date of Patent: May 30, 2017

(54) METHOD FOR LEVERAGING HYPERVISOR FUNCTIONALITY FOR MAINTAINING APPLICATION CONSISTENT SNAPSHOTS IN A VIRTUALIZATION ENVIRONMENT

(71) Applicant: Nutanix, Inc., San Jose, CA (US)

(72) Inventors: Chaitanya Venkata Krishna Bayapuneni, Santa Clara, CA (US); Parthasarathy Ramachandran, Palo Alto, CA (US)

(73) Assignee: Nutanix, Inc., San Jose, CA (US)

( * ) Notice: Subject to any disclaimer, the term of this patent is extended or adjusted under 35 U.S.C. 154(b) by 88 days.

(21) Appl. No.: 13/918,660

(22) Filed: Jun. 14, 2013

(65) Prior Publication Data

US 2016/0203013 A1    Jul. 14, 2016

(51) Int. Cl.
*G06F 9/455*   (2006.01)
*G06F 11/14*   (2006.01)

(52) U.S. Cl.
CPC ...... *G06F 9/45545* (2013.01); *G06F 11/1438* (2013.01); *G06F 11/1484* (2013.01); *G06F 2201/84* (2013.01)

(58) Field of Classification Search
CPC .................................................. G06F 9/45545
USPC .......................................................... 718/1
See application file for complete search history.

(56) References Cited

U.S. PATENT DOCUMENTS

| | | |
|---|---|---|
| 7,979,395 B1 | 7/2011 | Aggarwal et al. |
| 8,135,930 B1 | 3/2012 | Mattox et al. |
| 8,151,263 B1 | 4/2012 | Venkitachalam et al. |
| 8,364,858 B1 | 1/2013 | Martin et al. |
| 8,601,473 B1 | 12/2013 | Aron et al. |
| 8,656,386 B1 | 2/2014 | Baimetov |
| 8,762,967 B2 | 6/2014 | Kim |
| 8,850,130 B1 | 9/2014 | Aron et al. |
| 9,009,106 B1 | 4/2015 | Aron et al. |
| 9,069,708 B2 | 6/2015 | Gill et al. |
| 2004/0143832 A1 | 7/2004 | Yamamoto et al. |
| 2005/0055603 A1 | 3/2005 | Soran et al. |
| 2007/0074208 A1 | 3/2007 | Ling |
| 2007/0079298 A1 | 4/2007 | Tian |
| 2007/0174915 A1 | 7/2007 | Gribble et al. |
| 2007/0244938 A1* | 10/2007 | Michael et al. .............. 707/204 |
| 2008/0052331 A1 | 2/2008 | Ogawa et al. |
| 2008/0065854 A1* | 3/2008 | Schoenberg ........ G06F 9/45537 711/203 |

(Continued)

OTHER PUBLICATIONS

International Search Report and Written Opinion dated May 30, 2014, for PCT Patent Application No. PCT/US13/78389, 10 pages.

(Continued)

*Primary Examiner* — Charlie Sun
(74) *Attorney, Agent, or Firm* — Vista IP Law Group, LLP

(57) ABSTRACT

A method for leveraging hypervisor functionality for maintaining application consistent snapshots in a virtualization environment deployed by the hypervisor includes utilizing the hypervisor to generate a hypervisor-specific application consistent snapshot of a virtual machine running in the virtualization environment, taking a storage controller specific application consistent snapshot of the hypervisor-specific application consistent snapshot of the virtual machine, and logically deleting the hypervisor-specific application consistent snapshot.

24 Claims, 9 Drawing Sheets

(56) References Cited

U.S. PATENT DOCUMENTS

| | | |
|---|---|---|
| 2008/0115143 A1 | 5/2008 | Shimizu et al. |
| 2008/0244028 A1 | 10/2008 | Le |
| 2009/0125678 A1 | 5/2009 | Tokuda et al. |
| 2010/0011178 A1* | 1/2010 | Feathergill .......... G06F 11/1466 711/162 |
| 2010/0077165 A1 | 3/2010 | Lu et al. |
| 2010/0162242 A1 | 6/2010 | Grouzdev |
| 2011/0047340 A1* | 2/2011 | Olson ................. G06F 11/1456 711/162 |
| 2011/0154378 A1 | 6/2011 | Kishan et al. |
| 2011/0307531 A1 | 12/2011 | Gaponenko et al. |
| 2012/0005668 A1 | 1/2012 | Serizawa |
| 2012/0117299 A1 | 5/2012 | Waldspurger |
| 2012/0167082 A1 | 6/2012 | Kumar |
| 2012/0331462 A1 | 12/2012 | Falko |
| 2013/0179574 A1 | 7/2013 | Calder et al. |
| 2013/0198489 A1* | 8/2013 | Branson et al. .............. 712/200 |
| 2013/0227558 A1 | 8/2013 | Du |
| 2014/0195753 A1* | 7/2014 | Khatri et al. ................. 711/162 |
| 2014/0229949 A1 | 8/2014 | Cai |
| 2014/0282824 A1 | 9/2014 | Lango et al. |
| 2014/0317265 A1 | 10/2014 | James et al. |
| 2014/0325170 A1* | 10/2014 | Aswathanarayana et al. ............ 711/162 |
| 2014/0365740 A1* | 12/2014 | Vasilyev ............. G06F 11/1451 711/162 |
| 2015/0180714 A1 | 6/2015 | Chunn |
| 2015/0188775 A1 | 7/2015 | Van Der Walt |
| 2015/0248402 A1 | 9/2015 | Patterson, III |
| 2016/0202916 A1 | 7/2016 | Cui et al. |

OTHER PUBLICATIONS

Non-final Office Action dated Jun. 4, 2015 for related U.S. Appl. No. 13/926,921.
Final Office Action dated Dec. 22, 2015 for related U.S. Appl. No. 13/926,921.
Non-final Office Action dated Jan. 6, 2016 for related U.S. Appl. No. 13/928,097.
Final Office Action dated May 10, 2016 for related U.S. Appl. No. 13/928,097.
International Search Report and Written Opinion dated Jun. 22, 2015 for related PCT Patent Application No. PCT/US2015/020144.
Non-final Office Action dated Sep. 28, 2015 for related U.S. Appl. No. 14/206,924.
Final Office Action dated May 19, 2016 for related U.S. Appl. No. 14/206,924.
Non-final Office Action dated Jun. 3, 2016 for related U.S. Appl. No. 14/278,429.
Advisory Action dated Aug. 5, 2016 for related U.S. Appl. No. 14/206,924.
Non-final Office Action dated Aug. 11, 2016 for related U.S. Appl. No. 13/926,921.

* cited by examiner

METHOD FOR LEVERAGING HYPERVISOR FUNCTIONALITY FOR MAINTAINING APPLICATION CONSISTENT SNAPSHOTS IN A VIRTUALIZATION ENVIRONMENT

FIELD

This disclosure concerns a method for maintaining application consistent snapshots in a virtualization environment, and in particular to a method for maintaining application consistent snapshots in a virtualization environment by leveraging hypervisor functionality.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

In order to provide disaster recovery to or local/remote backups of VMs in a virtualization environment, snapshots of the VM state may be taken. These snapshots provide checkpoints of a VM's state at various points in time, and can be used to place a VM in a previous state for various disaster recovery or local/remote backup purposes. For example, a VM that has crashed may use a most recent snapshot to recover its state prior to crashing.

Snapshots may be taken of a VMs state at varying degrees of granularity. A crash-consistent snapshot includes the state of virtual resources for the VM, but may not include certain information regarding the state of the virtual operating system or applications running within the VM. Thus, a VM recovered from a crash-consistent snapshot may not exactly replicate its state prior to crashing. An application consistent snapshot includes the entire state of the VM, including the state of virtual resources, virtual operating system/kernel and applications running in the VM.

Conventionally, application specific snapshots for VMs are created by employing a third party backup server. The third party backup server manages the maintenance of VM snapshots by deploying a backup agent to run in the user-space of each of the VMs being managed. The backup agent at a given VM communicates with the hypervisor associated with the VM to create application consistent snapshots which are communicated to and maintained at the third party backup server. While the third party backup server is capable of properly maintaining application consistent backups of VMs, the need to create and deploy backup agents for different types of VMs becomes cumbersome. Because different VMs employ different operating systems/kernels, the third party backup server is required to create numerous different backup agent types in order to maintain snapshots for the various different VM types.

Therefore, there is a need for an improved approach for maintaining application consistent snapshots in a virtualization environment.

SUMMARY

Embodiments of the invention concern a method for leveraging built-in functionality of a hypervisor to create and maintain application consistent snapshots at the storage controller. Because the storage controller is provided with the functionality to optimally manage snapshots, whereas the hypervisor is not provided with the functionality to optimally manage snapshots the storage controller can overcome the inefficiencies of creating and maintaining hypervisor-specific application consistent snapshots using the hypervisor. Additionally, leveraging the built-in functionality of the hypervisor allows the storage controller to maintain storage-controller specific application consistent snapshots without having to deploy different backup agent types for different various different VM types as required when third party backup servers are utilized to maintain and manage application consistent snapshots.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Figure 1:
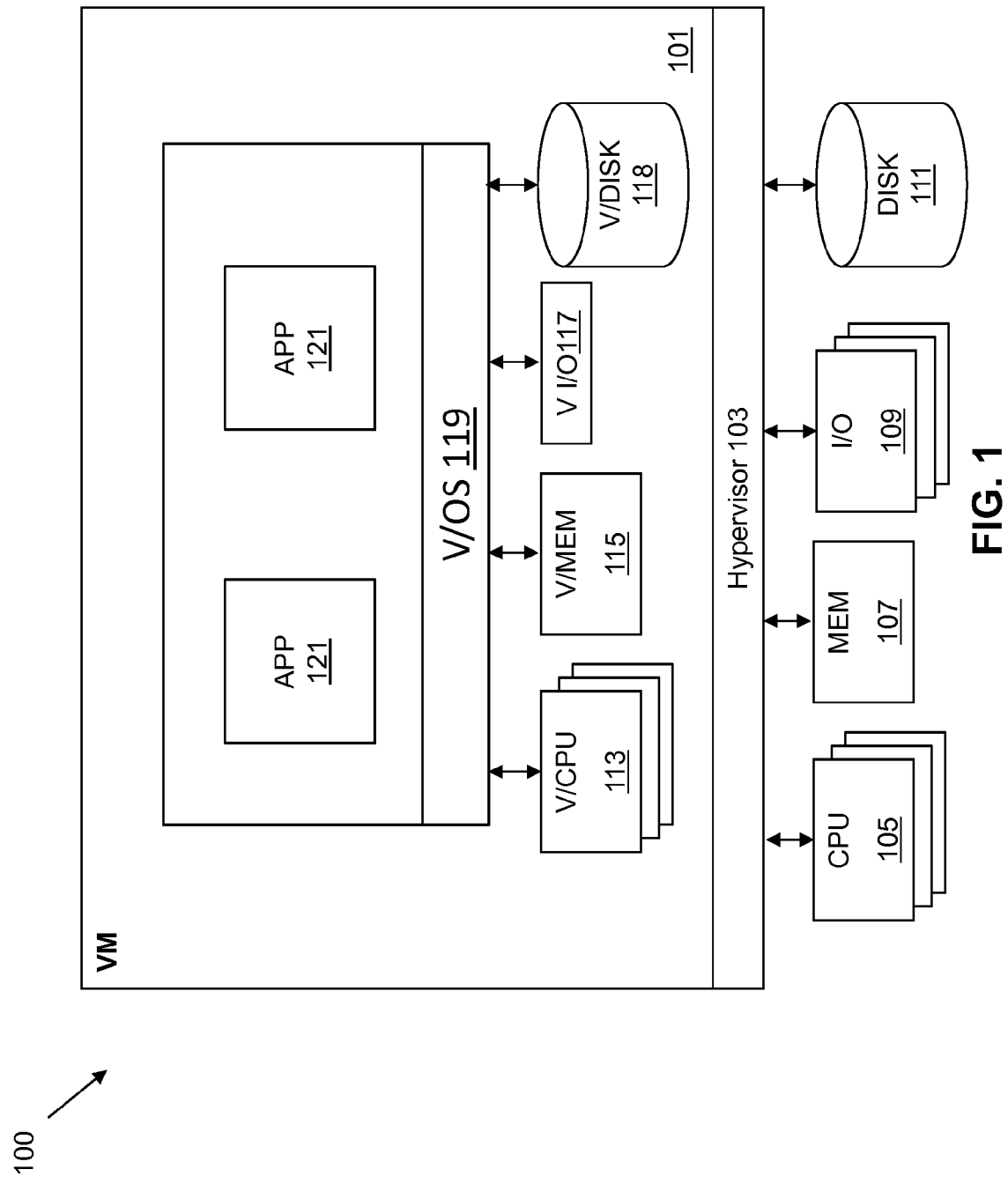
FIG. 1 illustrates an example virtualization environment in which a virtual machine (VM) is implemented.

FIG. 1 illustrates an example virtualization environment 100 in which a virtual machine (VM) 101 is implemented. A VM 101 is implemented by inserting a thin layer of software, known as a hypervisor 103, directly on a set of physical hardware resources. The set of physical resources may include CPU(s) 105, a memory 107, I/O devices 109, and storage 109. Additionally, the set of physical resources may include network devices (not shown) and any other physical hardware resources that may be utilized by the VM 101.

The virtual machine (VM) 101, which is a software abstraction of a physical machine, is then implemented above the hypervisor 103. The virtual machine 101 includes a set of virtual resources, such as a virtual CPU 113, a virtual memory 115, virtual I/O devices 117 and a virtual disk 118, which are software abstractions of the underlying physical resources that may be utilized by the operating environment of the VM 101. Additionally, the set of virtual resources may include a virtual network device (not shown) or any other software abstractions of underlying physical hardware resources. The VM 101 runs an operating system 119 using the virtual resources as well as user-level applications 121 that operate within the environment deployed by the operating system 119. The hypervisor 103 allocates the set of physical hardware resources dynamically and transparently to the VM 101, such that the applications 121 and the operating system 119 running within the VM 101 are not made aware that they are running on a virtualized platform.

By encapsulating an entire machine, including CPU, memory, operating system, and network devices, various operating environment types may be made to be compatible with a given set of physical resources. While only a single VM 101 is depicted in FIG. 1, it is important to note that any number of virtual machines may run above a hypervisor and utilize the same set of physical hardware resources. In this way, multiple different virtual machines can run different operating systems and multiple applications on the same physical computer.

In order to provide disaster recovery to or local/remote backups of VMs in a virtualization environment, snapshots of the VM state may be taken. These snapshots provide checkpoints of a VM's state at various points in time, and can be used to place a VM in a previous state for various disaster recovery or local/remote backup purposes. For example, a VM that has crashed may use a most recent snapshot to recover its state prior to crashing.

Snapshots may be taken of a VM's state at varying degrees of granularity. A crash-consistent snapshot includes the state of virtual resources for the VM, but may not include certain state information associated with the virtual operating system or applications running within the VM. Thus, a VM recovered from a crash-consistent snapshot may not exactly replicate its state prior to crashing. An application consistent snapshot includes the entire state of the VM, including the state of virtual resources, virtual operating system and applications running in the VM. It is often desirable for application consistent snapshots to be taken of VMs in order to ensure full recovery of the VM after failure.

Figure 2:
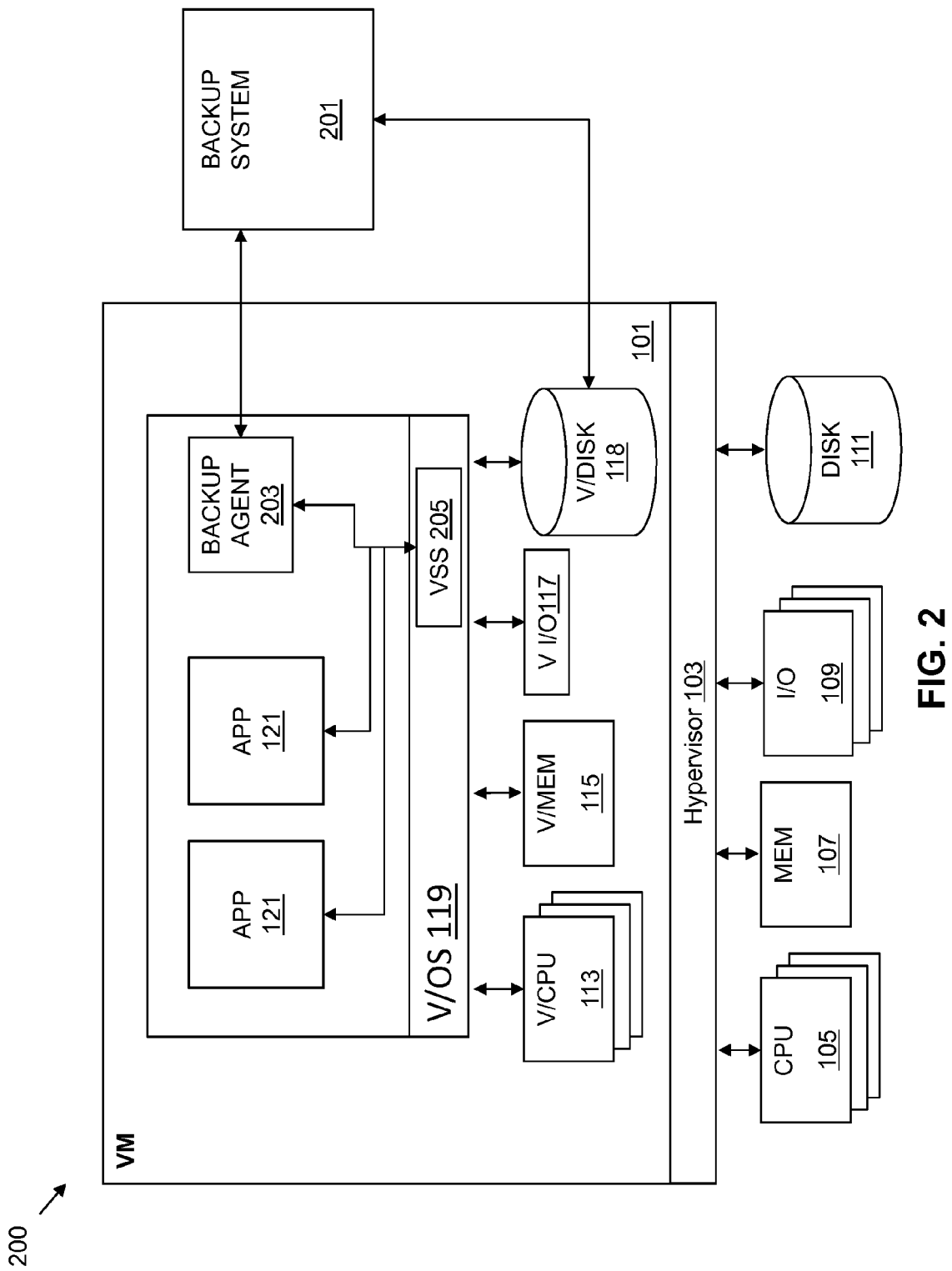
FIG. 2 illustrates an example system where a third party backup server is utilized for creating and maintaining application consistent snapshots for a virtualization environment.

Conventionally, application consistent snapshots for VMs are created by employing a third party backup server. FIG. 2 illustrates an example system 200 where a third party backup server 201 is utilized for creating and maintaining application consistent snapshots for a virtualization environment. The third party backup server 201 maintains application consistent VM snapshots by deploying a backup agent 203 to run in the user-space of the VM 101 being managed. While only a single VM is depicted in FIG. 2, it is important to note that the third party backup server 201 may be configured to maintain application consistent snapshots for any number of VMs. The backup server 201 creates different backup agent types for different VM environments, such that the backup agents 203 may properly function within the operating environment of its corresponding VM.

The backup agents 203 are configured to communicate with an operating system tool known as a volume shadow-copy service (VSS) 205, which runs within the operating system 119 of the VM 101 and provides a mechanism for obtaining application state for the VM 101. Whenever an application consistent snapshot is requested by the backup server 201, the backup agent 203 is called to send a request to the VSS 205 for obtaining application state of the VM 101. In response, the VSS 205, which is in communication with applications 121 running within the VM 101, directs the applications 121 to flush their contents into the virtual disk 118. At this point, the backup server 201 takes a snapshot of the virtual disk 118, which can subsequently be used by the backup server 201 to recover the state of the VM 101 at the time the snapshot was taken.

When a backup server 201 is utilized to provide snapshot maintenance for several different VMs executing various operating environments, inefficiencies may arise. While the third party backup server 201 is capable of properly maintaining application consistent snapshots of VMs, the need to create and deploy backup agents for different types of VMs becomes cumbersome. Because different VMs employ different operating systems, the third party backup server 201 is required to create numerous different backup agent types in order to maintain and service snapshots for the various different VM types, resulting in increased overhead associated with maintaining application consistent snapshots by the backup server 201.

Many hypervisors employ a hypervisor tool residing in the user space of the VM that is configured to communicate with the VSS of the operating systems running within its corresponding VM. This built-in functionality of the hypervisor allows the hypervisor to create application consistent snapshots without requiring a third party VM-specific tool to be deployed within the user-space of the VM, which will be described in greater detail below. Hereinafter, snapshots created by the hypervisor for maintenance and management at the hypervisor will be referred to as hypervisor-specific snapshots.

Figure 3:
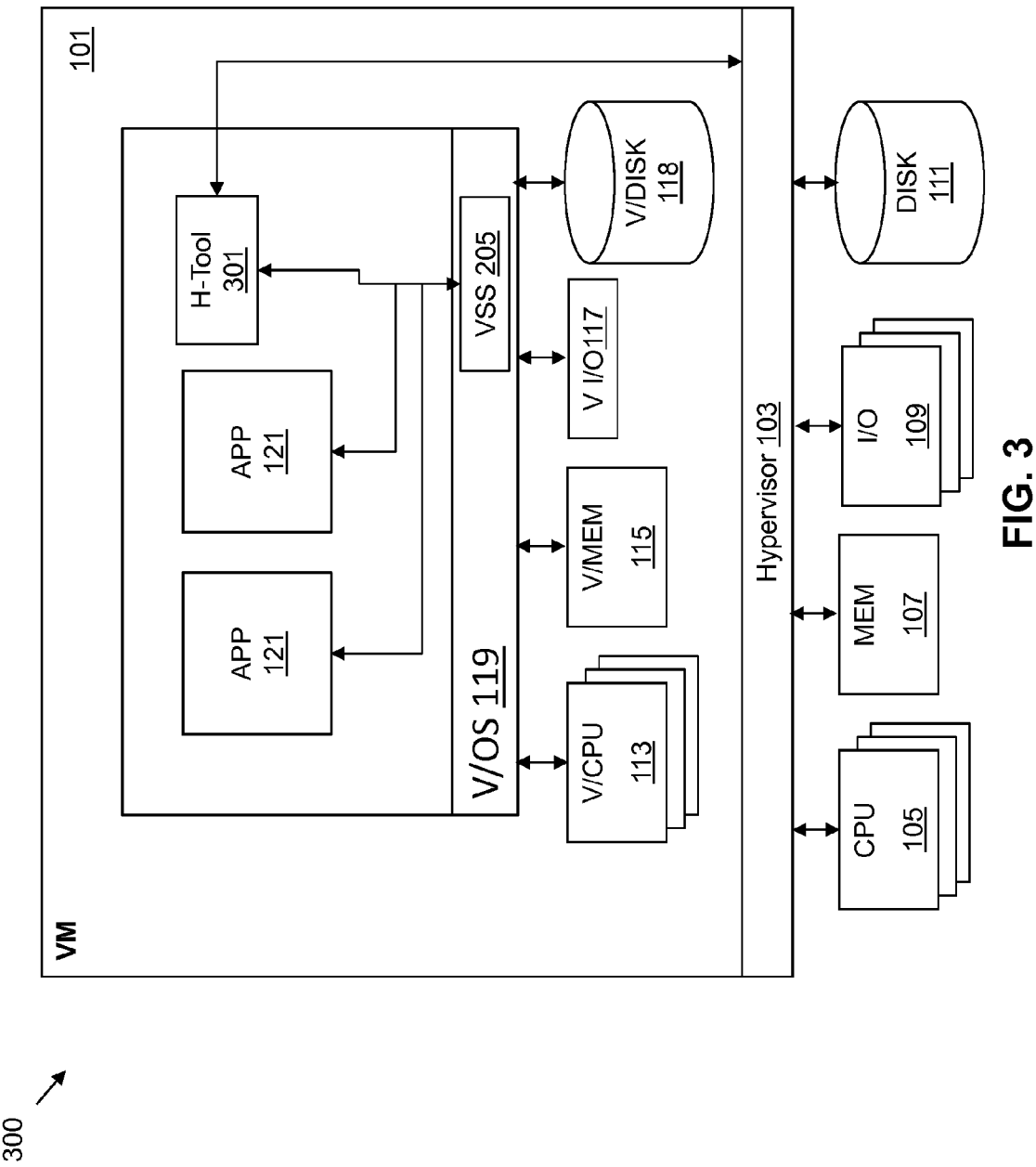
FIG. 3 illustrates a virtualization environment wherein a hypervisor tool is employed in the user space of the VM by the hypervisor to facilitate creation of application consistent snapshots.

FIG. 3 illustrates a virtualization environment 300 wherein a hypervisor tool is employed in the user space of the VM by the hypervisor to facilitate creation of hypervisor-specific application consistent snapshots.

In FIG. 3, the hypervisor tool 301 resides in the user-space of the VM 101, and is configured to communicate with both the hypervisor 103 and the VSS 205 residing in the operating system 119 of the VM 101. Whenever a hypervisor-specific application consistent snapshot is requested by the hypervisor 103, the hypervisor tool 301 is called to send a request to the VSS 205 for flushing application state to virtual disk 118. In response, the VSS 205, which is in communication with applications 121 running within the VM 101, directs the applications 121 to flush their contents into the virtual disk 118. At this point, the hypervisor 103 takes a hypervisor-specific application consistent snapshot of the virtual disk 118, which can subsequently be used to recover the state of the VM 101 at the time the snapshot was taken.

Figure 4:
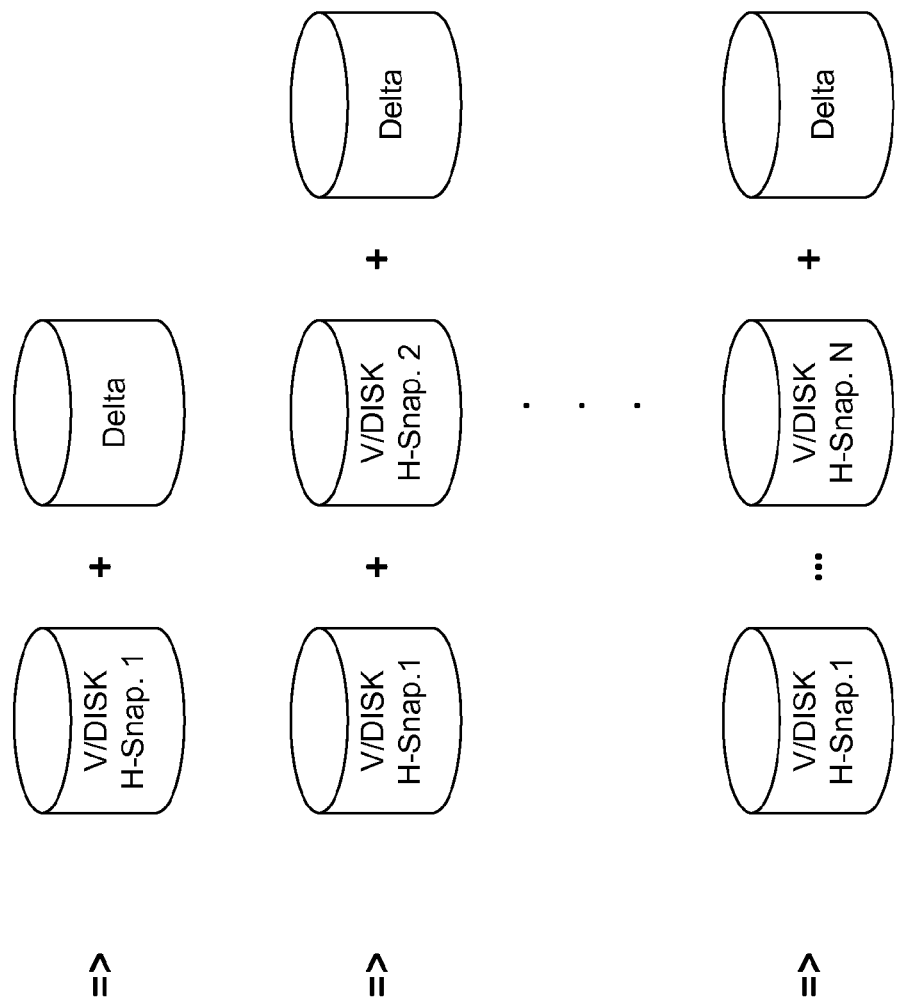
FIG. 4 illustrates an example of generating hypervisor-specific application consistent snapshots.
Figure 4:
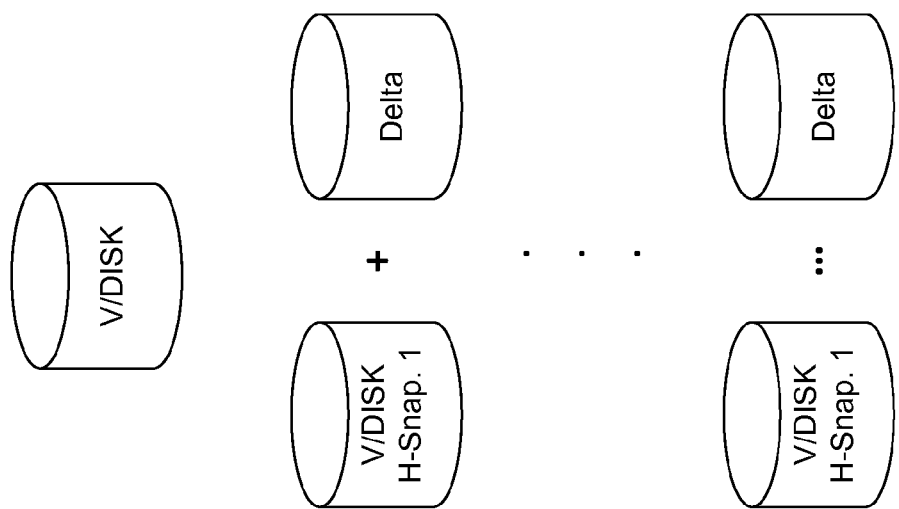

Although the built-in functionality of the hypervisor 103 allows for hypervisor-specific application consistent snapshots to be created without requiring a third party VM-specific tool to be deployed within the user-space of the VM 101, utilizing the hypervisor 103 to maintain hypervisor-specific application consistent snapshots for the VM 101 results in several inefficiencies. FIG. 4 illustrates an example of generating and maintaining hypervisor-specific application consistent snapshots.

When a first hypervisor-specific application consistent snapshot is taken of the VM's virtual disk 118, a first hypervisor-specific application consistent snapshot is created and a first hypervisor-specific delta virtual disk is also created. The first hypervisor-specific application consistent snapshot and the first delta virtual disk together replace the virtual disk of the VM. This is illustrated in FIG. 4. The first hypervisor-specific application consistent snapshot includes the state of the VM at the point in time that the snapshot was taken, and the first hypervisor-specific delta virtual disk includes any state information related to the VM incurred after the time of the first snapshot.

When a second snapshot is requested, a second hypervisor-specific application consistent snapshot and a second hypervisor-specific delta virtual disk are created. The second hypervisor-specific application consistent snapshot is a snapshot of the first hypervisor-specific delta virtual disk at the time the second snapshot is requested. Once the second hypervisor-specific application consistent snapshot is created, the first hypervisor-specific delta virtual disk no longer exists. The second hypervisor-specific delta virtual disk includes any state information related to the VM incurred after the time of the second snapshot. Together, the first hypervisor-specific application consistent snapshot, the second hypervisor-specific application consistent snapshot and the second hypervisor-specific delta virtual disk replace the virtual disk of the VM. This is also illustrated in FIG. 4.

This process of creating an additional hypervisor-specific application consistent snapshot and hypervisor-specific delta virtual disk is performed each time a hypervisor-specific application consistent snapshot is requested by the hypervisor, as illustrated in FIG. 4. Over time, the chain of hypervisor-specific application consistent snapshots and the hypervisor-specific delta virtual disk replacing the virtual disk of the VM may grow very large. As such, when state information for the VM is needed by the hypervisor, several different hypervisor-specific application consistent snapshots may need to be traversed.

Because creation of hypervisor-specific application consistent snapshots using the hypervisor results in the hypervisor having to maintain and traverse several different hypervisor-specific application consistent snapshots at any given time in order to obtain state information for the VM, the hypervisor will begin to operate inefficiently. This is compounded by the fact that hypervisors are not provided with the functionality to optimally manage snapshots.

Instead, a storage controller optimized to maintain and manage snapshots and virtual disks may leverage the built-in functionality of the hypervisor to create and maintain storage-controller specific application consistent snapshots. As used herein, the term storage-controller specific snapshot refers to a snapshot taken by the storage controller to be managed by the storage controller. This is to be contrasted with the hypervisor-specific snapshot, which refers to a snapshot taken by the hypervisor tool to be managed by the hypervisor.

Because the storage controller is provided with the functionality to optimally manage snapshots, the storage controller can overcome the inefficiencies of creating and maintaining hypervisor-specific application consistent snapshots using the hypervisor. Additionally, by leveraging the built-in functionality of the hypervisor allows the storage controller to maintain storage-controller specific application consistent snapshots without having to deploy different backup agent types for different various different VM types.

Figure 5:
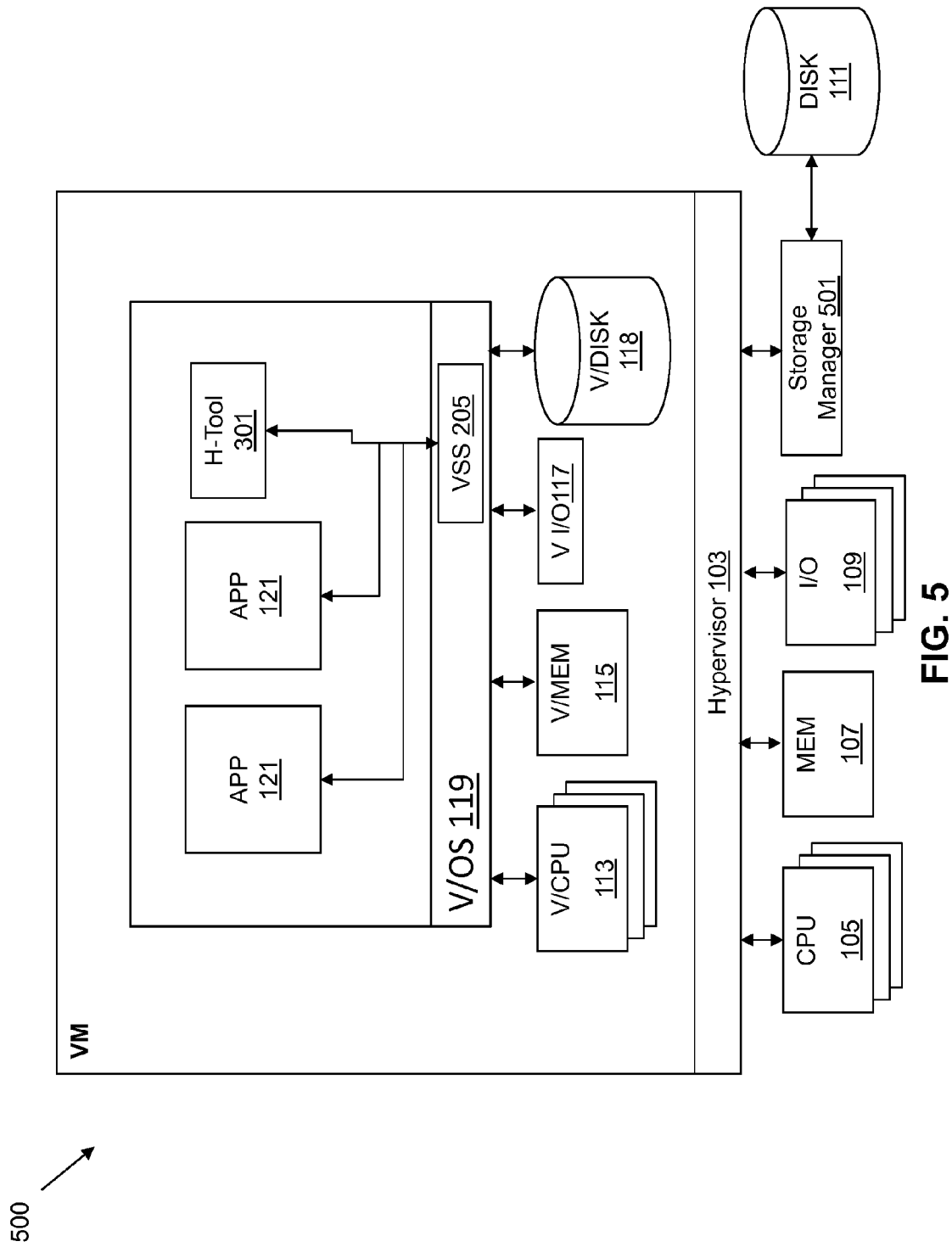
FIG. 5 illustrates a system wherein a storage controller leverages the built-in functionality of a hypervisor to create and maintain application consistent snapshots for a virtualization environment according to some embodiments.

FIG. 5 illustrates a system 500 wherein a storage controller leverages the built-in functionality of a hypervisor to create and maintain storage-controller specific application consistent snapshots for a virtualization environment. The virtualization environment includes a set of physical hardware resources. These physical hardware resources may include CPU(s) 105, memory 115, I/O devices 109, and physical disk 111. A storage controller 501 may be implemented to maintain the contents of the physical disk 111. While the storage controller 501 of FIG. 5 is depicted as maintaining the contents of a single physical disk, one ordinarily skilled in the art will recognize that the storage controller 501 may be configured to maintain the contents of several different physical disks 111. Additionally, while the storage controller 501 of FIG. 5 is depicted as servicing a single hypervisor 103 and VM 101, one ordinarily skilled in the art will recognize that the storage controller 501 may be configured to service any number of hypervisors and corresponding virtual machines across any number of nodes (e.g., servers).

The hypervisor 103 is inserted directly on the set of physical hardware resources and the virtual machine (VM) 101, which is a software abstraction of a physical machine, is implemented above the hypervisor 103. As described above, the hypervisor 103 allocates the set of physical hardware resources dynamically and transparently to the virtual machine 101, such that the virtual machine 101 can implement a virtual environment that includes virtual resources 113, 115, 117, 118, a virtual operating system 119, and various applications 121 running in the user space deployed by the virtual operating system 119.

The operating system 119 includes a volume shadow-copy service (VSS) 205. As described above, the VSS 205 is an operating system tool that communicates with applications 121 running in the user space of the VM 101 to provide a mechanism for obtaining application state for the VM 101. The VSS 205 is capable of directing the applications 121 running in the user space of the VM 101 to flush their contents to a virtual disk 118 such that an application consistent snapshot of the VM may be taken.

The hypervisor 103 employs a hypervisor tool 301 residing in the user space of the VM 101 that is configured to communicate with the VSS 205 of the operating system 119 running within its corresponding VM 101. Whenever a hypervisor-specific application consistent snapshot is requested by the hypervisor 103, the hypervisor tool 301 is called to send a request to the VSS 205 for flushing application state to the virtual disk 118. In response, the VSS 205, which is in communication with applications 121 running within the VM 101, directs the applications 121 to flush their contents into the virtual disk 118. At this point, the hypervisor 103 takes a hypervisor-specific application consistent snapshot of the virtual disk 118, which can subsequently be used to recover the state of the VM 101 at the time the snapshot was taken.

Figure 6:
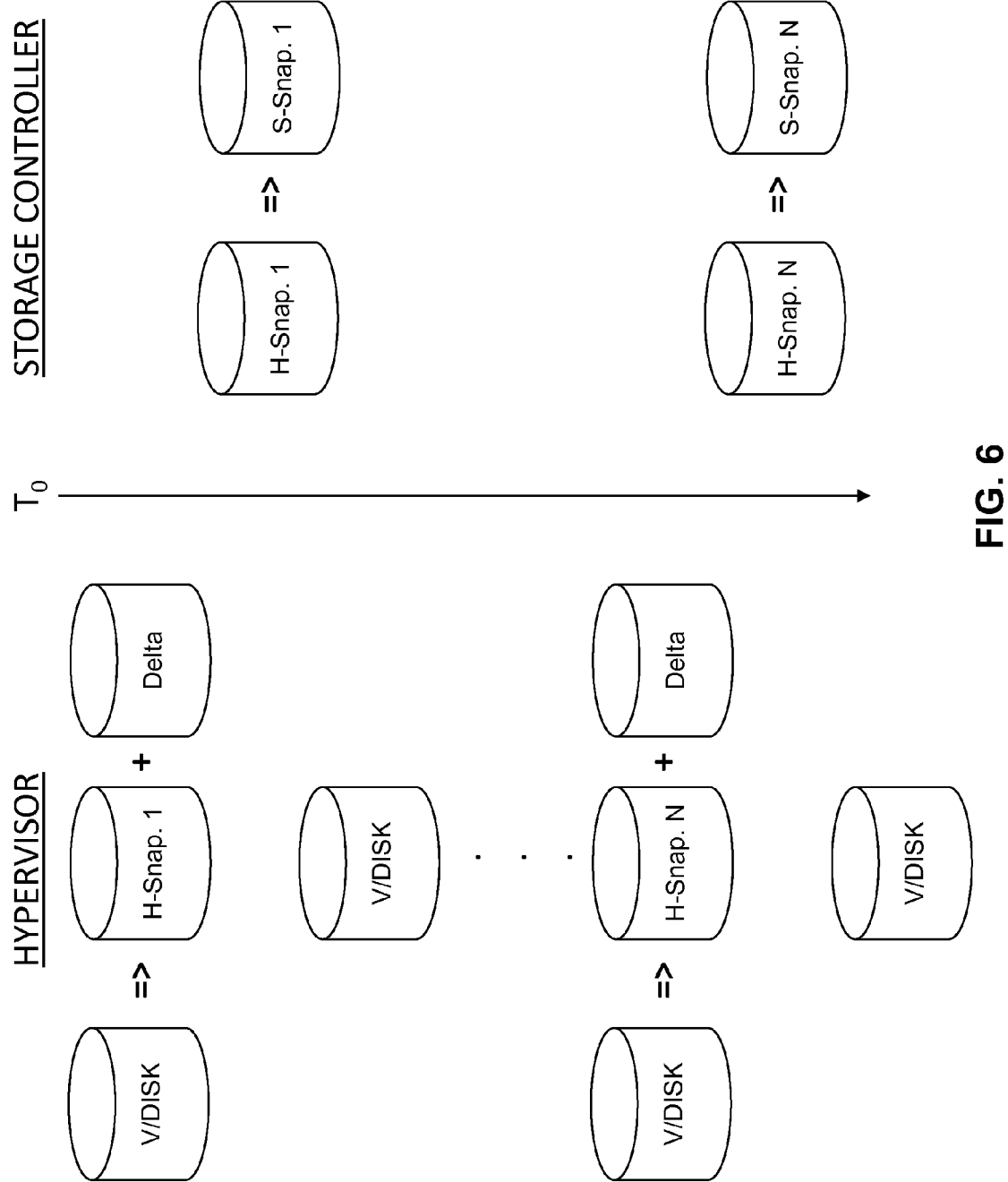
FIG. 6 illustrates an example of generating storage-controller specific virtual disk snapshots according to some embodiments.

FIG. 6 is a diagram illustrating the process of generating storage-controller specific virtual disk snapshots over time. The left-side of FIG. 6 depicts the functionality of the hypervisor and the right-side of FIG. 6 depicts the functionality of the storage controller. The process begins at time $T_0$ (e.g., top of FIG. 6) and may continue indefinitely.

When the hypervisor take a first hypervisor-specific application consistent snapshot of the virtual disk, a hypervisor-specific application consistent snapshot and a hypervisor-specific delta virtual disk snapshot is created by the hypervisor as illustrated in FIG. 6. At this point, the storage controller takes a storage-controller specific application consistent snapshot of the hypervisor-specific application consistent snapshot as illustrated in FIG. 6. The storage-controller specific application consistent snapshot replicates all of the state information of the hypervisor-specific application consistent snapshot. By taking a storage-controller specific application consistent snapshot, the storage controller can independently manage and maintain application consistent snapshots for the VM, rather than relying on the hypervisor for management and maintenance.

Once the storage-controller specific application consistent snapshot has been taken by the storage controller, the hypervisor-specific application consistent snapshot and hypervisor-specific delta virtual disk may be consolidated back into a single virtual disk as shown in FIG. 6. This process continues each time a storage-controller specific application consistent snapshot is requested. The storage controller maintains and manages the storage-controller specific application consistent snapshots such that the hypervisor-specific application consistent snapshots no longer need to be maintained once the storage-controller specific application consistent snapshot is created. Thus, rather than having the hypervisor maintain long chains of hypervisor-specific application consistent snapshots and hypervisor-specific delta virtual disks, maintenance of only a single virtual disk is required for the hypervisor. This in turn increases the hypervisor's efficiency, as it only needs to manage a single virtual disk rather than several hypervisor-specific application consistent snapshots at a time.

By leveraging the built-in functionality of the hypervisor to create and maintain application consistent snapshots at the storage controller rather than at the hypervisor, inefficiencies of maintaining application consistent snapshots at the hypervisor may be avoided. This is because the storage controller is provided with the functionality for optimally handling management and maintenance of snapshots. Additionally, as mentioned above, leveraging the built-in functionality of the hypervisor allows the storage controller to maintain application consistent snapshots without having to deploy different backup agent types for different various different VM types.

Figure 7:
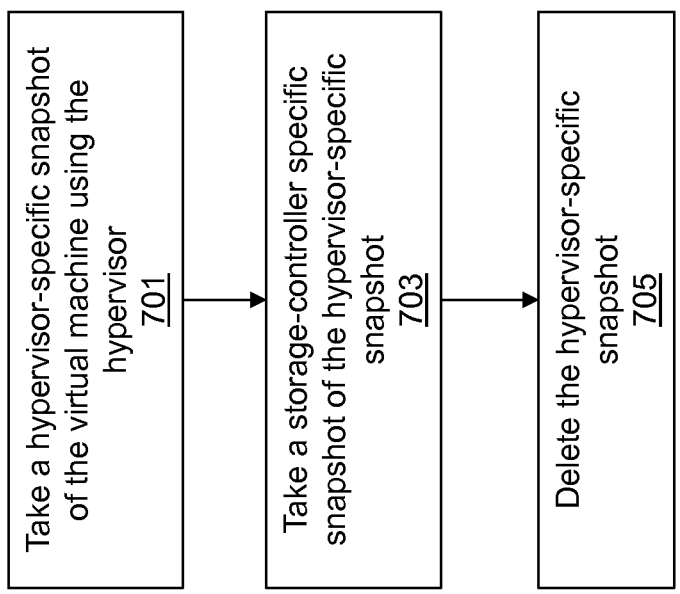
FIG. 7 is a flow chart illustrating a method for leveraging built-in functionality of a hypervisor to create and maintain storage controller-specific application consistent snapshots in accordance with some embodiments.

FIG. 7 is a flow chart illustrating a method for leveraging built-in functionality of a hypervisor to create and maintain application consistent snapshots at the storage controller in accordance with some embodiments of the invention.

Initially, a hypervisor-specific application consistent snapshot is taken for the VM using the hypervisor as shown at 701. As mentioned above, the hypervisor may employ a hypervisor tool residing in the user space of the VM that is configured to communicate with a VSS of the operating systems running within its corresponding VM. The VSS is an operating system tool that communicates with applications running in the user space of the VM to provide a mechanism for obtaining application state for the VM. The VSS is capable of directing the applications running in the user space of the VM to flush their contents to a virtual disk such that an application consistent snapshot of the VM may be taken.

Whenever a hypervisor-specific application consistent snapshot is requested by the hypervisor, the hypervisor tool is called to send a request to the VSS for flushing application state to disk. In response, the VSS, which is in communication with applications running within the VM, directs the applications to flush their contents into the virtual disk. At this point, the hypervisor takes a snapshot of the virtual disk, which can subsequently be used to recover the state of the VM at the time the snapshot was taken.

When the hypervisor takes a first hypervisor-specific application consistent snapshot of the virtual disk, a first hypervisor-specific application consistent snapshot and a hypervisor-specific delta virtual disk is created. The first hypervisor-specific application consistent snapshot includes the state of the VM at the point in time that the snapshot was taken, and the first hypervisor-specific delta virtual disk includes any state information related to the VM incurred after the time of the snapshot.

Once the hypervisor-specific virtual disk snapshot is taken, a storage-controller specific application consistent snapshot is taken of the hypervisor-specific application consistent snapshot as shown at 703. The storage-controller specific application consistent snapshot replicates all of the state information of the hypervisor-specific application consistent snapshot. By taking a storage-controller specific application consistent snapshot, the storage controller can independently manage and maintain application consistent snapshots for the VM, rather than relying on the hypervisor for management and maintenance.

After the hypervisor-specific application consistent snapshot has been taken, the hypervisor-specific application consistent snapshot and hypervisor-specific delta virtual disk may be consolidated into a single virtual disk as shown at 705. Thus, rather than having the hypervisor maintain long chains of hypervisor-specific application consistent snapshots and hypervisor-specific delta virtual disks, maintenance of only a single virtual disk is required for the hypervisor. This in turn increases the hypervisor's efficiency, as it only needs to manage a single virtual disk rather than several at a time.

Figure 8:
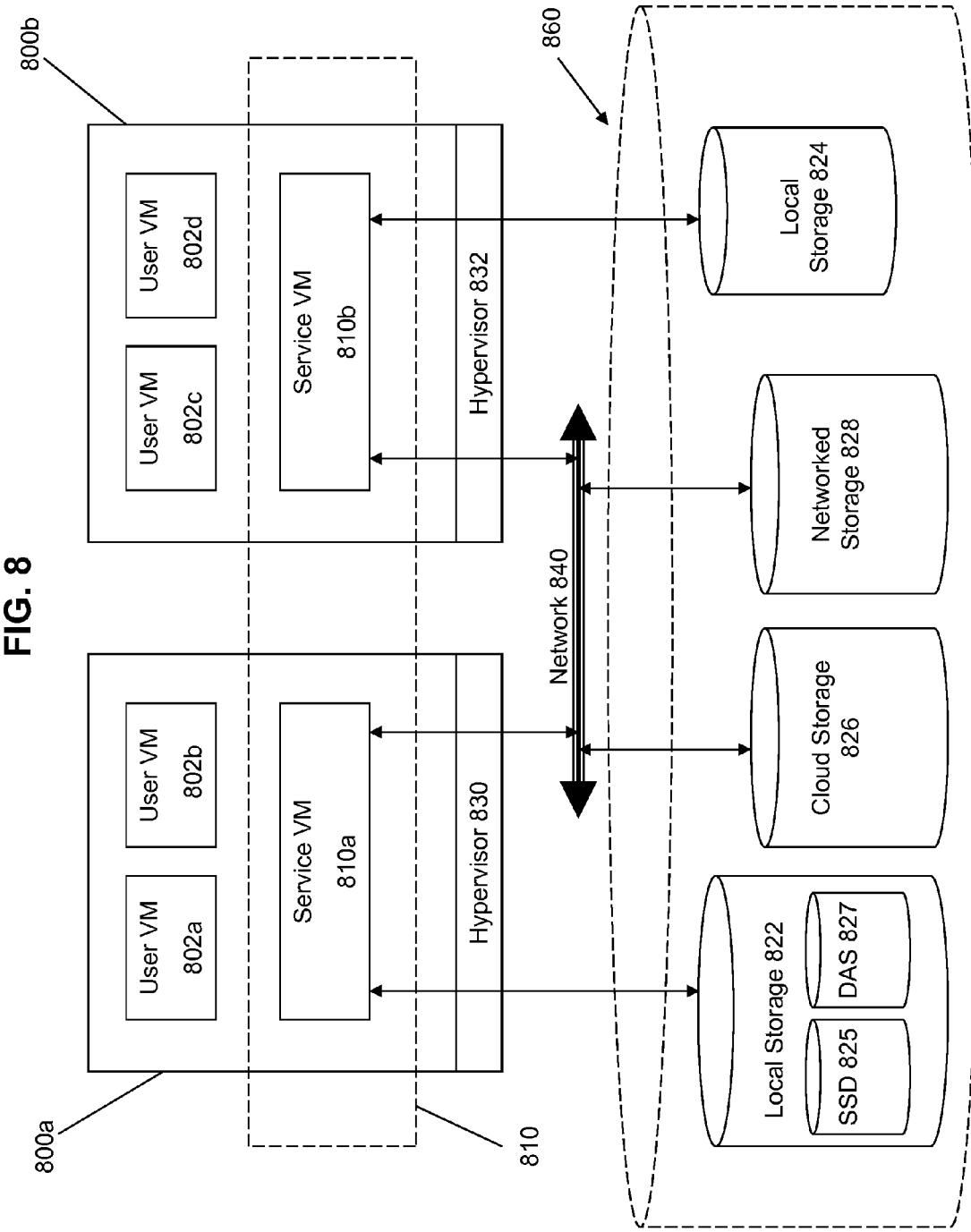
FIG. 8 illustrates an alternative system wherein a storage management component leverages the built-in functionality of a hypervisor to create and maintain storage-controller specific application consistent snapshots according to some embodiments.

In addition to the virtualization environment depicted in FIG. 5, alternative virtualization environments that employ storage management features may leverage the built-in functionality of the hypervisor for maintaining and managing application consistent snapshots. FIG. 8 illustrates an alternative virtualization environment wherein a storage management component leverages the built-in functionality of a hypervisor to create and maintain application consistent snapshots for several different VMs.

FIG. 8 illustrates an architecture for implementing storage management in a virtualization environment according to some embodiments of the invention. The architecture of FIG. 8 can be implemented for a distributed platform that contains multiple servers 800a, 800b that manages multiple-tiers of storage. The multiple tiers of storage include storage that is accessible through a network, such as cloud storage 826 or networked storage (e.g., a SAN or "storage area network") 828. The present embodiment also permits local storage 822, 824 that is within or directly attached to the server 800a, 800b and/or appliance to be managed as part of the storage pool 860. Examples of such storage include Solid State Drives (SSDs) and spindle disk drives (henceforth "HDDs" or "spindle drives") 825. These collected storage devices, both local and networked, form a storage pool 860. Virtual disks (or "vDisks") can be structured from the storage devices in the storage pool 860. As used herein, the term vDisk refers to the storage abstraction that is exposed by a Service VM 810a, 810b to be used by a user VM 802a, 802b, 802c, 802d.

Each server 800a, 800b runs virtualization software, which includes a hypervisor 830, 832 to manage the interactions between the underlying hardware and the one or more user VMs 802a, 802b, 802c, 802d that run client software.

A special VM is used to manage storage and I/O activities according to some embodiments of the invention, which is referred to herein as a "service VM" 810a, 810b. This is the "storage controller" in the currently described architecture. Multiple such storage controllers 810a, 810b coordinate within a cluster to form a single-system. The service VMs 810a, 810b are not formed as part of specific implementations of hypervisors 830, 832. Instead, the service VMs 810a, 810b run as virtual machines above the hypervisor 830, 832 on the various servers 800a, 800b, and work together to form a distributed system that manages all the storage resources, including the locally attached storage 822, 824, the networked storage 828, and the cloud storage 826. Since the service VMs 810a, 810b run above the hypervisors 830, 832, this means the that the current approach can be used and implemented within any virtual machine architecture, since the service VMs 810a, 810b of embodiments of the invention can be used in conjunction with any hypervisor from any virtualization vendor.

Each service VM 810a, 810b exports one or more block devices or NFS server targets that appear as disks to the client VMs 802a, 802b, 802c, 802d. These disks are virtual, since they are implemented by the software running inside service VMs 810a, 810b. Thus, to the user VMs 802a, 802b, 802c, 802d, the service VMs 810a, 810b appear to be exporting a clustered storage appliance that contains some disks. All user data (including the operating system) in the client VMs 802a, 802b, 802c, 802d resides on these virtual disks.

The virtualization architecture depicted in FIG. 8 is contrasted with the virtualization architecture depicted in FIG. 5, in that the storage controllers (e.g., service VMs) 810a, 810b in the virtualization environment depicted in FIG. 8 reside within the virtualization environment deployed by the hypervisors 830, 832 rather than residing outside the virtualization environment deployed by the hypervisors. Additional details regarding the virtualization architecture depicted in FIG. 8 are described in co-pending application Ser. No. 13/207,345, entitled "Architecture for Managing I/O and Storage for a Virtualization Environment" which is hereby incorporated by reference in its entirety.

The mechanism for leveraging the built-in functionality of a hypervisor to create and maintain storage-controller specific application consistent snapshots at the service VM operates in a substantially similar manner to that described above, and as such will not be described again in detail. It is important to note that in the architecture depicted in FIG. 8, it is the service VM residing within the virtualization environment deployed by the hypervisor that leverages the functionality of the hypervisor to generate storage-controller specific application consistent snapshots.

System Architecture

Figure 9:
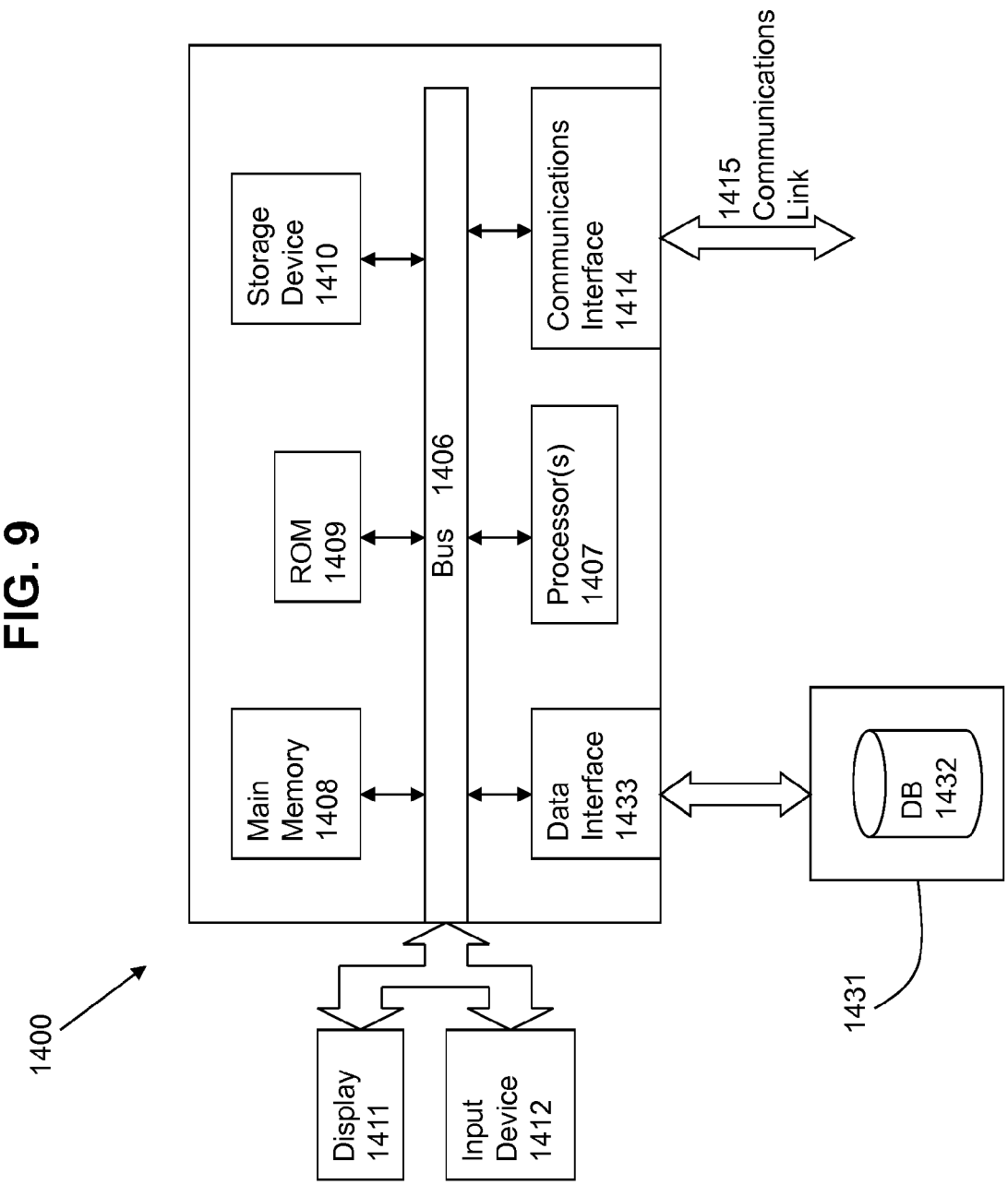
FIG. 9 is a block diagram of an illustrative computing system suitable for implementing an embodiment of the present invention

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for leveraging hypervisor functionality for maintaining application consistent snapshots in a virtualization environment deployed by a hypervisor, comprising:
   exporting, by a service virtual machine (VM), one or more NFS server targets that appear as virtual disks to client virtual machines (VMs), wherein the virtual disks are implemented by software running inside the service virtual machine (VM);
   utilizing, by the service virtual machine (VM), the hypervisor to generate a hypervisor-specific application consistent snapshot of a virtual disk from the virtual disks that corresponds to a virtual machine from the client virtual machines (VMs) running in the virtualization environment, wherein the service virtual machine (VM) is a special VM deployed by the hypervisor that functions as a storage controller;
   in response to the utilizing, by the service virtual machine (VM), the hypervisor to generate the hypervisor-specific application consistent snapshot, generating, by the service virtual machine (VM), a storage-controller specific application consistent snapshot of the hypervisor-specific application consistent snapshot of the virtual disk to overcome inefficiencies of creating and maintaining the hypervisor-specific application consistent snapshots using the hypervisor, wherein the storage-controller specific application consistent snapshot replicates state information of the hypervisor-specific application consistent snapshot; and
   logically deleting the hypervisor-specific application consistent snapshot.

2. The method of claim 1, wherein the utilizing the hypervisor to generate the hypervisor-specific application consistent snapshot comprises:
   employing a hypervisor tool residing in a user space of the virtual machine to communicate with a volume shadow-copy service (VSS) residing in an operating system of the virtual machine;
   requesting the VSS to direct applications running in the user space of the virtual machine to flush their contents into a virtual disk associated with the virtual machine by the hypervisor tool; and
   taking a snapshot of the virtual disk to generate the hypervisor-specific application consistent snapshot of the virtual machine.

3. The method of claim 2, wherein the taking the snapshot of the virtual disk to generate the hypervisor-specific application consistent snapshot comprises creating the hypervisor-specific application consistent snapshot and a hypervisor-specific delta virtual disk to replace the virtual disk.

4. The method of claim 3, wherein the logically deleting the hypervisor-specific application consistent snapshot comprises consolidating the hypervisor-specific application consistent snapshot and the hypervisor-specific delta virtual disk.

5. The method of claim 1, wherein the storage-controller specific application consistent snapshot is independently managed and maintained by the service virtual machine (VM).

6. The method of claim 5, wherein the service virtual machine (VM) resides outside of the virtualization environment deployed by the hypervisor.

7. The method of claim 5, wherein the service virtual machine (VM) resides inside the virtualization environment deployed by the hypervisor as a service virtual machine (VM).

8. The method of claim 1, wherein the logically deleting the hypervisor-specific application consistent snapshot allows the hypervisor to manage only a single virtual disk.

9. A computer program product embodied on a non-transitory computer readable medium, the non-transitory computer readable medium having stored thereon a sequence of instructions which, when executed by a processor causes the processor to execute a method for leveraging hypervisor functionality for maintaining application consistent snapshots in a virtualization environment deployed by a hypervisor, comprising:
   exporting, by a service virtual machine (VM), one or more NFS server targets that appear as virtual disks to client virtual machines (VMs), wherein the virtual disks are implemented by software running inside the service virtual machine (VM);
   utilizing, by the service virtual machine (VM), the hypervisor to generate a hypervisor-specific application consistent snapshot of a virtual disk from the virtual disks that corresponds to a virtual machine from the client virtual machines (VMs) running in the virtualization environment, wherein the service virtual machine (VM) is a special VM deployed by the hypervisor that functions as a storage controller;
   in response to the utilizing, by the service virtual machine (VM), the hypervisor to generate the hypervisor-specific application consistent snapshot, generating, by the service virtual machine (VM), a storage-controller specific application consistent snapshot of the hypervisor-specific application consistent snapshot of the virtual disk to overcome inefficiencies of creating and maintaining the hypervisor-specific application consistent snapshots using the hypervisor, wherein the storage-controller specific application consistent snapshot replicates state information of the hypervisor-specific application consistent snapshot; and
   logically deleting the hypervisor-specific application consistent snapshot.

10. The computer program product of claim 9, wherein the utilizing the hypervisor to generate the hypervisor-specific application consistent snapshot comprises:
    employing a hypervisor tool residing in a user space of the virtual machine to communicate with a volume shadow-copy service (VSS) residing in an operating system of the virtual machine;
    requesting the VSS to direct applications running in the user space of the virtual machine to flush their contents into a virtual disk associated with the virtual machine by the hypervisor tool; and taking a snapshot of the virtual disk to generate the hypervisor-specific application consistent snapshot of the virtual machine.

11. The computer program product of claim 10, wherein the taking the snapshot of the virtual disk to generate the hypervisor-specific application consistent snapshot comprises creating the hypervisor-specific application consistent snapshot and a hypervisor-specific delta virtual disk to replace the virtual disk.

12. The computer program product of claim 11, wherein the logically deleting the hypervisor-specific application consistent snapshot comprises consolidating the hypervisor-specific application consistent snapshot and the hypervisor-specific delta virtual disk.

13. The computer program product of claim 9, wherein the storage-controller specific application consistent snapshot is independently managed and maintained by the service virtual machine (VM).

14. The computer program product of claim 13, wherein the service virtual machine (VM) resides outside of the virtualization environment deployed by the hypervisor.

15. The computer program product of claim 13, wherein the service virtual machine (VM) resides inside the virtualization environment deployed by the hypervisor.

16. The computer program product of claim 9, wherein the logically deleting the hypervisor-specific application consistent snapshot allows the hypervisor to manage only a single virtual disk.

17. A system for leveraging hypervisor functionality for maintaining application consistent snapshots in a virtualization environment deployed by a hypervisor, comprising:
    a service virtual machine (VM), wherein the service virtual machine (VM) is a special VM deployed by the hypervisor that functions as a storage-controller, and wherein the service virtual machine (VM) exports one or more NFS server targets that appear as virtual disks to client virtual machines (VMs), wherein the virtual disks are implemented by software running inside the service virtual machine (VM);
    hardware resources;
    the hypervisor functionally connected to the hardware resources, and configured to deploy the virtualization environment; and
    a virtual machine from the client virtual machines (VMs) functionally connected to the hypervisor, the virtual machine comprising:
        one or more virtual resources;
        a virtual disk;
        a virtual operating system having a volume shadow-copy service (VSS);
        one or more applications running in a user space of the virtual machine; and
        a hypervisor tool running in the user space of the virtual machine;
    wherein:
        the service virtual machine (VM) employs the hypervisor to utilize the hypervisor tool to flush state of the one or more applications into the virtual disk;
        the hypervisor generates a hypervisor-specific application consistent snapshot of the virtual machine by taking a snapshot of the virtual disk; and
        the service virtual machine (VM) takes a storage-controller specific application consistent snapshot of the hypervisor-specific application consistent snapshot to overcome inefficiencies of creating and maintaining the hypervisor-specific application consistent snapshots using the hypervisor, wherein the storage-controller specific application consistent snapshot replicates state information of the hypervisor-specific application consistent snapshot.

18. The system of claim 17, wherein the service virtual machine (VM) resides outside of the virtualization environment deployed by the hypervisor.

19. The system of claim 18, wherein the hypervisor-specific application consistent snapshot is logically deleted after the storage-controller takes the storage-controller specific application consistent snapshot.

20. The system of claim 19, wherein the logically deleting the hypervisor-specific application consistent snapshot comprises consolidating the hypervisor-specific application consistent snapshot and they hypervisor-specific delta virtual disk.

21. The system of claim 17, wherein the service virtual machine (VM) resides inside the virtualization environment deployed by the hypervisor.

22. The system of claim 17, wherein utilizing the hypervisor tool to flush state of the one or more applications into the virtual disk comprises requesting the VSS to direct the one or more applications running in the user space of the virtual machine to flush their contents into a virtual disk associated with the virtual machine by the hypervisor tool.

23. The system of claim 17, wherein the taking the snapshot of the virtual disk to generate the hypervisor-specific application consistent snapshot comprises creating the hypervisor-specific application consistent snapshot and a hypervisor-specific delta virtual disk to replace the virtual disk.

24. The system of claim 17, wherein the storage-controller specific application consistent snapshot is independently managed and maintained by the service virtual machine (VM).

* * * * *